United States Patent [19]
Rückl

[11] Patent Number: 5,754,219
[45] Date of Patent: May 19, 1998

[54] DEVICE FOR PRODUCING A PRINTING STENCIL INCLUDING CONTROLLING A SHAPE OF A MIRROR DIRECTING A BEAM ONTO THE STENCIL IN ACCORDANCE WITH A DISTANCE FROM A SENSOR TO THE STENCIL

[75] Inventor: Siegfried Rückl, Langkampfen, Austria

[73] Assignee: Schablonentechnik Kufstein Aktiengesellschaft, Kufstein, Austria

[21] Appl. No.: 518,481

[22] Filed: Aug. 23, 1995

[30] Foreign Application Priority Data

Aug. 24, 1994 [EP] European Pat. Off. ............ 94113224

[51] Int. Cl.[6] ......................................................... B41J 2/47
[52] U.S. Cl. .................................................. 347/256; 347/260
[58] Field of Search ................................ 347/256, 257, 347/258, 259, 260, 241, 242, 243, 134

[56] References Cited

U.S. PATENT DOCUMENTS

| | | | |
|---|---|---|---|
| 4,734,557 | 3/1988 | Alfille et al. ......................... | 219/121 |
| 5,166,504 | 11/1992 | Protz et al. .......................... | 250/201.1 |
| 5,223,971 | 6/1993 | Magel ................................ | 359/295 |
| 5,331,338 | 7/1994 | Mager . | |
| 5,353,047 | 10/1994 | Nakamura et al. ..................... | 347/256 |

FOREIGN PATENT DOCUMENTS

| | | |
|---|---|---|
| 0209449 | 7/1985 | European Pat. Off. . |
| 0550022 | 12/1991 | European Pat. Off. . |
| 0562149 | 9/1993 | European Pat. Off. . |
| 4123052 | 9/1990 | Germany . |

OTHER PUBLICATIONS

Dr. K. von Grote, et al. "Material Processing with Lasser", *Laser+Electro-Optik*, 2253, Jr. 9, No. 4 (Nov. 1977).

*Primary Examiner*—Mark J. Reinhart

[57] ABSTRACT

A device for producing a printing stencil, in particular a screen printing stencil, having a rotatably supported printing cylinder, a laser for generating a laser beam incident on the printing cylinder and capable of being displaced in the longitudinal direction of the printing cylinder, and focusing optics to focus the laser beam onto the surface of the printing cylinder. The focusing optics have at least one deflection mirror with an elastically deformable mirror diaphragm. At least one sensor is provided to measure a distance between itself and the surface of the printing stencil. An actuating signal generator generates an actuating signal as a function of the measured distance. Actuating devices set a curvature of the mirror diaphragm as a function of the actuating signal.

22 Claims, 13 Drawing Sheets

DEVICE FOR PRODUCING A PRINTING STENCIL INCLUDING CONTROLLING A SHAPE OF A MIRROR DIRECTING A BEAM ONTO THE STENCIL IN ACCORDANCE WITH A DISTANCE FROM A SENSOR TO THE STENCIL

BACK OF THE INVENTION

1. Field of the Invention

The invention relates to a device for producing a printing stencil.

2. Description of the Related Art

A device of this type is already generally known and contains a rotatably supported printing cylinder, a laser for generating a laser beam incident on the printing cylinder and capable of being displaced in the longitudinal direction of the printing cylinder, and focusing optics to focus the laser beam onto the surface of the printing cylinder.

In the engraving of printing stencils with the aid of a laser beam it is necessary to allow the position of the waist of the beam to follow small deviations of the printing stencil or of the workpiece rapidly, in order to concentrate the position of the highest beam energy always on the surface of the workpiece, specifically even when this surface shows positional deviations with respect to an expected course.

It has already been proposed, in the event of a deviation of this kind, to adjust a lens system, consisting of one or more lenses, in a corresponding manner by means of suitable movement. The time within which such a compensating movement can take place is, however, mostly too long in the case of relatively large and rapidly occurring surface deviations. Thus for the compensation of a surface positional deviation of one millimeter, the lens system also has to be adjusted by one millimeter, which requires a relatively long time.

SUMMARY OF THE INVENTION

The invention is based on the object of further developing the device of the type mentioned at the outset such that the waist of the beam of the laser beam can be displaced very much more rapidly in the direction of its beam axis.

These and other objects may be realized by providing a device for which the focusing optics have at least one deflection mirror with an elastically deformable mirror diaphragm, there are actuating means which set a curvature of the mirror diaphragm as a function of an actuating signal, at least one sensor is provided to measure a distance between itself and the surface of the printing stencil, and there is an actuating signal generator which generates the actuating signal as a function of the measured distance.

Using the device according to the invention, the displacement movement can be reduced considerably in relation to the surface deviation to be controlled out, so that an adjustment of the focus position of the laser beam or an alteration of the focal spot diameter in the region of the laser beam point of incidence is possible in a very short time.

The displacement of the mirror diaphragm can preferably be carried out by means of piezoelectric or magnetostrictive actuating means, which operate virtually without inertia and enable very high displacement speeds.

As already mentioned above, the mirror diaphragm can be of circular design, but can also be oval or elliptical. In the two last-mentioned cases, in particular in the case of large angles of incidence, relatively large imaging errors can therefore be avoided, as will be further discussed later.

The actuating means preferably act on only a central rear part of the mirror diaphragm, which leads to a simple construction of the deflection mirror. The actuating means can act on the mirror diaphragm on the rear side or else via an annular blade. A plurality of actuating means can also act on this annular blade, for example three actuating means, which are spaced apart uniformly from one another over the annular periphery.

According to a refinement of the invention, the mirror diaphragm is thicker in the center than at its edge, as a result of suitable shaping of its rear side.

As a result of the action of the actuating means, the reflective surface of the mirror diaphragm is deformed in a specific manner. The aim is that beams reflected at the mirror diaphragm always intersect at one point. However, in order that the mirror diaphragm may be deformed in this way, a strongly defined curvature must be maintained for its rear side, which leads to the thickness variation, mentioned at the outset, of the mirror diaphragm, seen in the radial direction. In this arrangement, the diaphragm thickness can increase continuously from the outer diaphragm deflection region, viewed radially inwards. In addition, there can be at least one point of inflection on the rear side between centre and edge. There can also be on the rear side in the centre a plateau on whose edge the annular blade rests.

The edge of the mirror diaphragm can, for example, be connected integrally to an actuating means housing or can be clamped in between actuating means housing parts. In this case, along the rear-side outer peripheral edge of the mirror diaphragm there is a deeper recess to form the diaphragm deflection region.

According to another advantageous refinement of the invention, the position of an actuating head of the actuating means can be detected to determine the position of the mirror diaphragm. This position of the actuating head, which acts on the central region of the mirror diaphragm, can be fed as the current position to a control loop which, for example, emits a signal voltage corresponding to a desired position to the actuating means. As a result, a still more accurate displacement of the mirror diaphragm may be carried out.

The position of the actuating head can in particular be detected by interference of a light beam reflected at it with another light beam, so that a very high resolution capability is achieved by evaluating the interference rings produced in the process.

According to a further development of the invention, a plurality of deflection mirrors with displaceable mirror diaphragms can be located in the laser beam path. As a result it becomes possible to compensate for even relatively large positional deviations, without the displacement travel of the individual mirrors becoming too large and, in certain circumstances, the permissible prolonged alternating strength ranges or prolonged threshold strength ranges of the mirror diaphragm being exceeded. Also, as a result of the operation of a plurality of such deflection mirrors, the actuating time necessary for compensating for the positional deviations can be reduced further.

According to another very advantageous further development of the invention, this plurality of deflection mirrors is arranged in different planes. As a result, errors in particular in the deviation of the focal lengths of the sagittal and the meridional plane can be reduced further.

If, in addition, the focusing optics contain a focusing lens system, there follows for the total focal length of the combined lens-mirror system the relationship:

$$\frac{1}{f_{total}} = \frac{1}{f_{lens}} + \frac{1}{f_{mirror}} \quad (1)$$

Here, the focal length $f_{mirror}$ is to be set positive for a concave radius of curvature of the deflection mirror and negative for a convex radius of curvature. As a lens system here, selection is always made of a converging lens system or at least one which behaves in total as a converging lens system. Accordingly, the focal length $f_{lens}$ is always positive. The waist of the laser beam of small beam divergence is produced during the passage of the same through the lens system essentially in the environment of the focal point of the lens system. Deflection mirror and lens system are in this case preferably arranged at such distances from one another that the above relationship (1) is satisfied.

If, for example, a single lens is selected as lens system and it is further assumed that the focal length of this single lens is 50 mm and the total focal length of the system composed of the single lens and the deflection mirror is to be able to be set to between 50 and 49 mm, the deflection mirror in the case of the total focal length of 50 mm must be exactly planar and, in the case of the total focal length of 49 mm, must have a focal length of 2450 mm. This focal length requires a mirror radius which is twice as large, that is to say here about 4900 mm. If a circular disc-shaped diaphragm, which is supported rotatably at the edge, is now bent by a force acting on its rear side, there is then produced in each meridian cross-section a bending curve which corresponds to a good approximation to a circularly bent concave mirror. By means of a corresponding configuration of the diaphragm thickness variation from the center to the edge, the shape of the bending line can be matched to any desired curve variation.

For the relationship between the bending of a spherically curved circular membrane and the spherical radius, the following expression is obtained:

$$b = R - \sqrt{R^2 - (d^2/4)} \quad (2)$$

Here, b represents the bending, R the spherical radius and d the diameter of the circular diaphragm.

The laser beams normally used for the operating purposes have a diameter of about 15 mm after the exit from the laser resonator. If a reflective circular diaphragm of 25 mm diameter is used and if it is desired to bend this such that a radius of curvature of 4900 mm is established, this requires a bending of about 16 μm in accordance with the relationship just mentioned. The specified relationship of the diaphragm diameter to the beam diameter (25/15) results from the known requirement of laser technology that the beam boundaries should be approximately 1.7 times the $1/e^2$ beam edge, in order to avoid diffraction phenomena which could have an unfavourable influence on the operating result.

The relationship of the displacement of the waist of the beam to the actuating movement at the mirror diaphragm then corresponds to 1000/16=62.5. The diaphragm used as mirror therefore has to be bent only by one 62.5th part of the displacement movement of the waist of the beam. If it is considered that this diaphragm needs to be designed only so thick that just the dissipation of heat is ensured (on a mirror equipped with a dielectric multilayer coating, about 5 W power loss is incident in the case of a 1 kW laser beam), it can be seen that the masses to be moved are also very much smaller than if lenses and associated holders had to be moved. Accordingly, the mechanical inherent frequencies of the device according to the invention are very high and tracking of the laser beam waist at right angles to the surface of the printing stencil or of the workpiece can therefore be carried out extremely rapidly.

The focusing optics or the lens system and the at least one deflection mirror are advantageously arranged on a common slide, which can be moved relative to the printing stencil or screen printing stencil or to the workpiece. If, for example, a screen printing stencil of hollow-cylindrical design is present, which carries a light-sensitive lacquer layer on its surface and is rotated rapidly about its longitudinal axis, the slide can be moved, during the rotation of the screen printing stencil about its longitudinal axis, parallel to this longitudinal axis, in order to be able to expose the screen printing stencil or the lacquer layer present upon it along a spiral track, region by region or point by point. If, in so doing, deviations of the screen printing stencil from its ideal circular shape occur, which can be determined by means of a sensor arranged on its periphery, the actual position of the wall of the screen printing stencil with respect to its ideal position can be calculated in the region of the laser beam point of incidence, using the output signals of this sensor, from which position an actuating signal can be produced in order to adjust the waist of the beam of the laser beam in the beam direction such that this comes to rest once more in the region of the surface of the screen printing stencil. A corresponding process is described in European Patent Application No. 94 106 498.2, which to this extent is also made the subject-matter of the present application.

BRIEF DESCRIPTION OF THE DRAWINGS

The invention is described in detail below with reference to the drawings, in which.

DETAILED DESCRIPTION OF THE PREFERRED EMBODIMENTS

Figure 1:
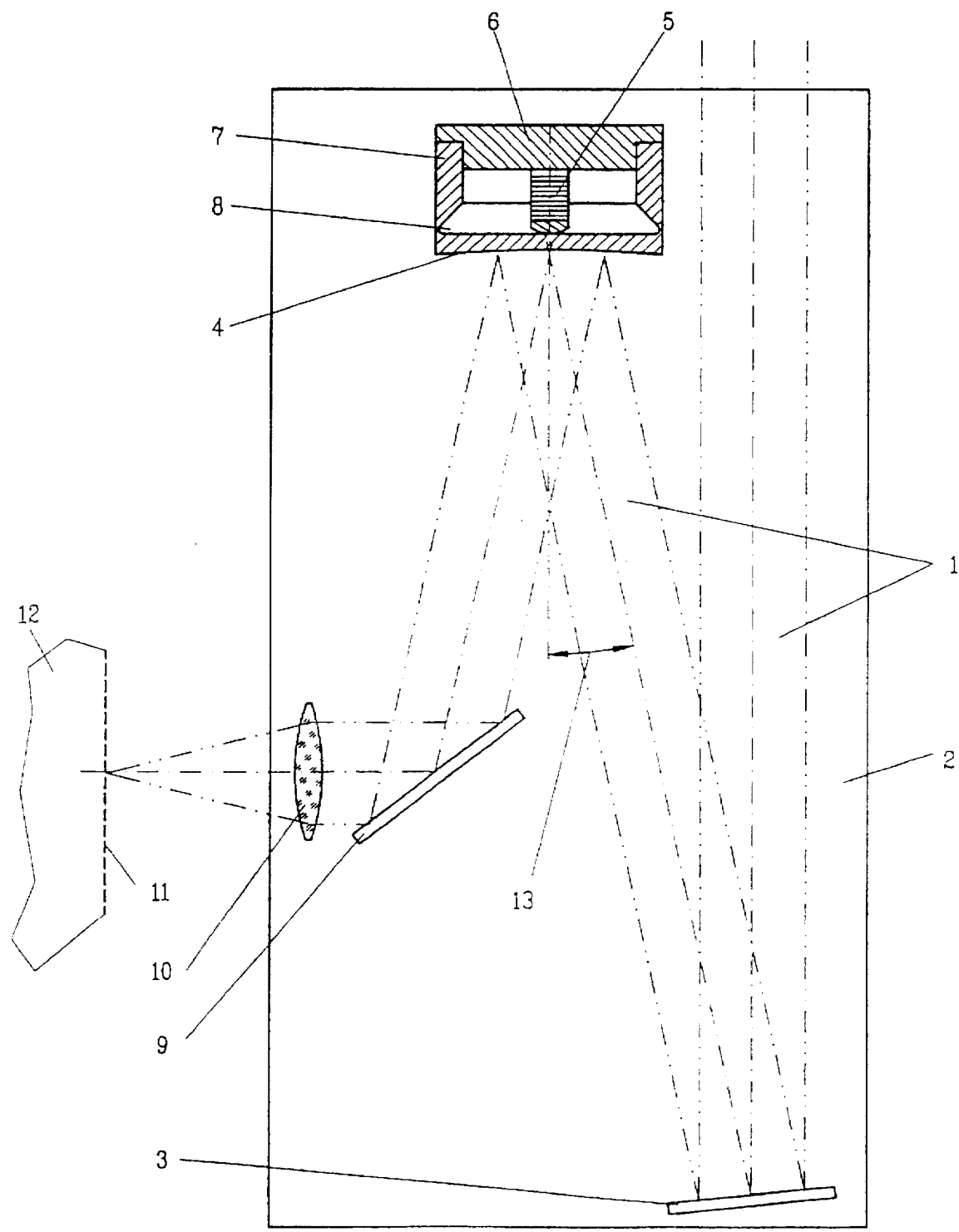
FIG. 1 shows a top view of a focusing apparatus according to a first exemplary embodiment of the invention.

A first exemplary embodiment of a laser beam focusing apparatus according to the invention is shown in FIG. 1. A laser beam 1 of about 15 mm diameter is incident, coming from above, on a first deflection mirror 3 fastened on a slide 2 and is deflected by this first deflection mirror 3 onto a mirror or concave mirror diaphragm 4. The just-mentioned beam diameter relates to that beam diameter at which the intensity has fallen off to the $1/e^2$ part, that is to say to 13.53% of the mean intensity of the beam. The radius of curvature of the mirror surface of the mirror diaphragm 4 can be altered by means of a piezo element 5. For this purpose, the piezo element 5 is driven using an electrical actuating signal. In the case of so-called piezo multilayer elements, a voltage signal of the order of magnitude of 100 V is sufficient for this. The piezo element 5 is supported at one end on a housing base 6 which is connected via an annular part 7 to the concave mirror diaphragm 4. The connection between the annular part 7 and the concave mirror diaphragm 4 is here of integral design. At the point of transition between the annular part 7 and the concave mirror diaphragm 4, there is produced by a turned groove 8 a very thin wall section extending in the peripheral direction, which can be designated the diaphragm deflection region, so that the concave mirror diaphragm 4 virtually behaves like a plate supported freely rotatably at the edge. After the reflection of the laser beam 1 by the concave mirror diaphragm 4, the laser beam 1 is initially only weakly focused because of the very large focal length of 2450 mm and thus runs, after a further reflection at a deflection mirror 9, through a focusing lens 10. This then finally focuses the laser beam 1 on the surface 11 of a workpiece 12, the workpiece 12 in the present case being a lacquer-covered stencil, for example a hollow-cylindrical screen printing stencil with a cylinder longitudinal axis, parallel to which the slide 2 is displaced. In this case, the focused laser beam 1 is incident in the radial direction on the screen printing stencil. In the case of the beam course shown here, because of the small angle of incidence 13, no further measure is necessary to correct imaging errors (astigmatism or coma).

The production of the concave mirror diaphragm 4 can, for example, be carried out such that an adjusting screw is inserted into the housing base 6 instead of the piezo element 5, the prefabricated concave mirror diaphragm 4 is bent outwards with this adjusting screw by, for example, 16 µm and, in this condition, the concave mirror diaphragm 4 is ground flat and polished flat. If, after completing these production operations, the adjusting screw is removed, the concave mirror diaphragm 4 springs back by 16 µm and there is now a concave mirror in the stress-free condition.

The latter can be deformed by the extending piezo element 5, until, at an extension of the piezo element 5 by, for example, 16 µm, the planar position generated during the machining is just reached once more. If, for example, for the diaphragm at 25 mm diameter, a thickness of 1 mm is chosen and, as material, an AlCuMg alloy, a necessary force of 14N is obtained for 16 µm mean bending and a mechanical bending loading in the center of the diaphragm of 225N/mm². It can be seen from this that the necessary bending processes take place in the purely elastic region and are therefore reversible. A material will naturally be selected as the diaphragm material, as in the case of the just calculated example, which has an expanded elastic region, for example Cu-alloyed aluminium (hard) or hardened spring steel. These materials can be provided with a multiple reflective layer made of dielectric materials in order to achieve reflectivities of 0.998 and above.

By means of a selectable electrical actuating signal which is applied to the piezo element 5, the extension of the latter can be set in a suitable way and, accordingly, the focal length of the concave mirror diaphragm 4.

Figure 3:
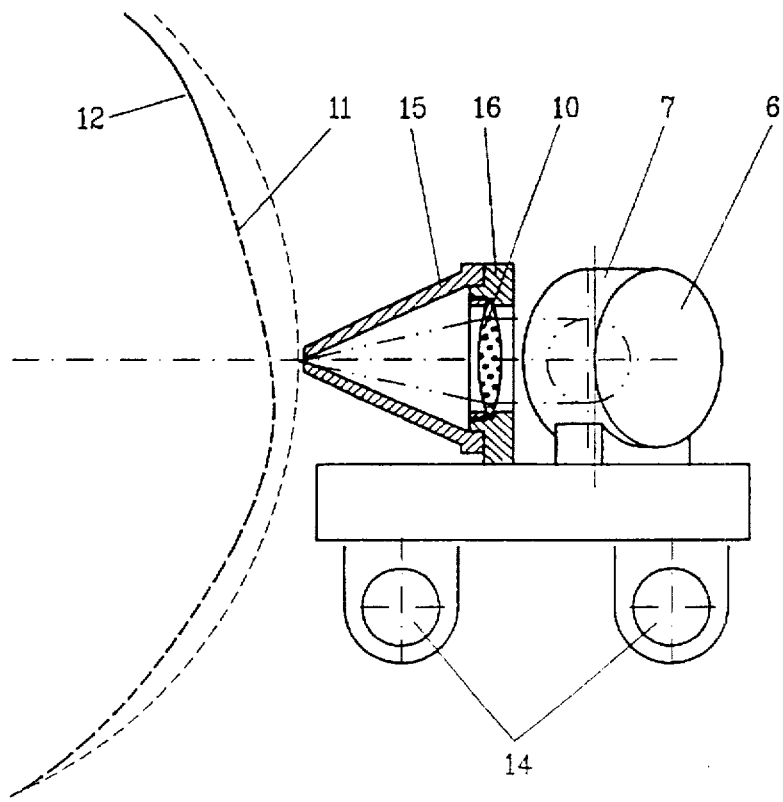
FIG. 3 shows a side view of the focusing apparatus according to FIG. 2.
Figure 2:
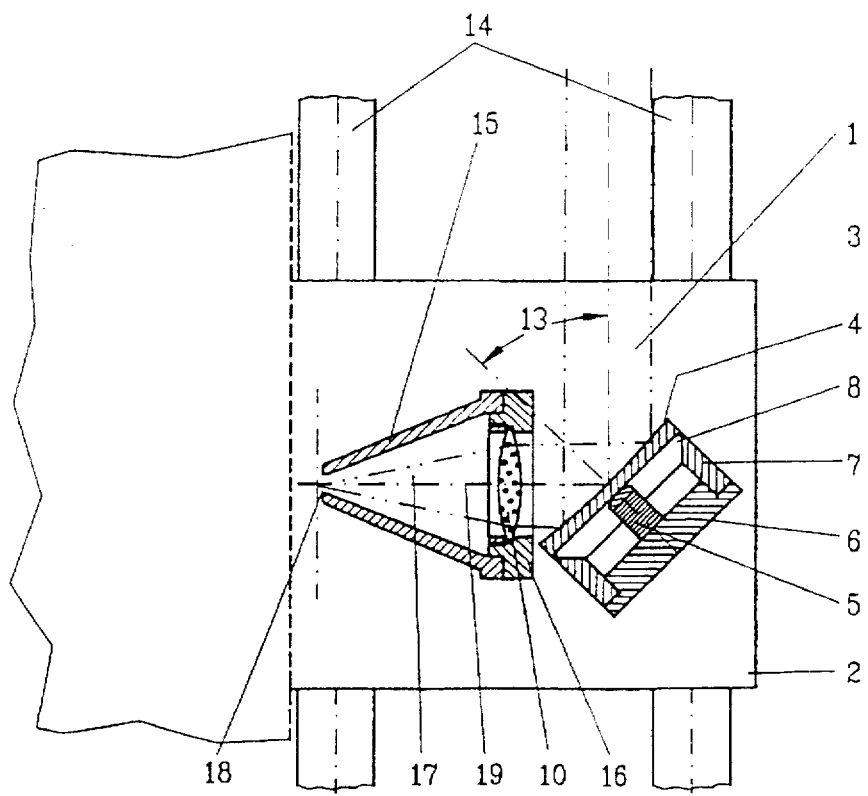
FIG. 2 shows a top view of a focusing apparatus according to a second exemplary embodiment of the invention.

In FIGS. 2 and 3, the same elements as in FIG. 1 are provided with the same reference symbols. Here, a somewhat simpler beam path of the laser beam 1 is drawn which, however, places higher requirements on the optical correction of the focusing apparatus. The slide 2 with the optical elements, arranged thereon, for focusing the laser beam 1 runs on two guides 14 which are located at a distance from each other and lying parallel to each other and also lie parallel to the cylinder axis of the screen printing cylinder, which is provided here with the reference symbol 12. Its surface 11 deviates in the region of the engraving head from its ideal position, as can be seen from FIG. 3, this ideal position being marked by the thin dashed line drawn in. In order to be able to displace the waist of the beam of the laser beam 1 in the direction of the cylinder surface 11, the piezo element 5 is driven by a suitable radial actuating signal, the generation of which has been described in principle in the already mentioned European Patent Application No. 94 106 498.2.

Between the lens 10 and the surface 11 to be machined there is furthermore a protective nozzle 15. This is screwed onto a lens mount 16 which holds the focusing lens 10. By means of a gas connection, not shown any further, on the protective nozzle 15, protective gas or air passes into the nozzle internal space 17 and flows out from there via a nozzle opening 18. The already strongly focused laser beam 1 also emerges from the protective nozzle 15 through the same nozzle opening 18. The gas flow serves essentially to prevent the access of particles to the focusing lens 10 and damage to it by the particles.

The beam guidance of the laser beam 1 is configured very simply here, tolerating a very large angle of incidence with reference to the concave mirror element 4. Because of this large angle of incidence 13, there is, though, the risk of relatively large imaging errors. These are described in more detail using the isometric drawing of the following FIG. 4. With reference to the designations used there, it should be mentioned that the sectional plane through the protective nozzle 15 shown in FIG. 2 is the meridional plane and the plane at right angles to this, through the optical axis 19, is the sagittal plane.

Figure 4:
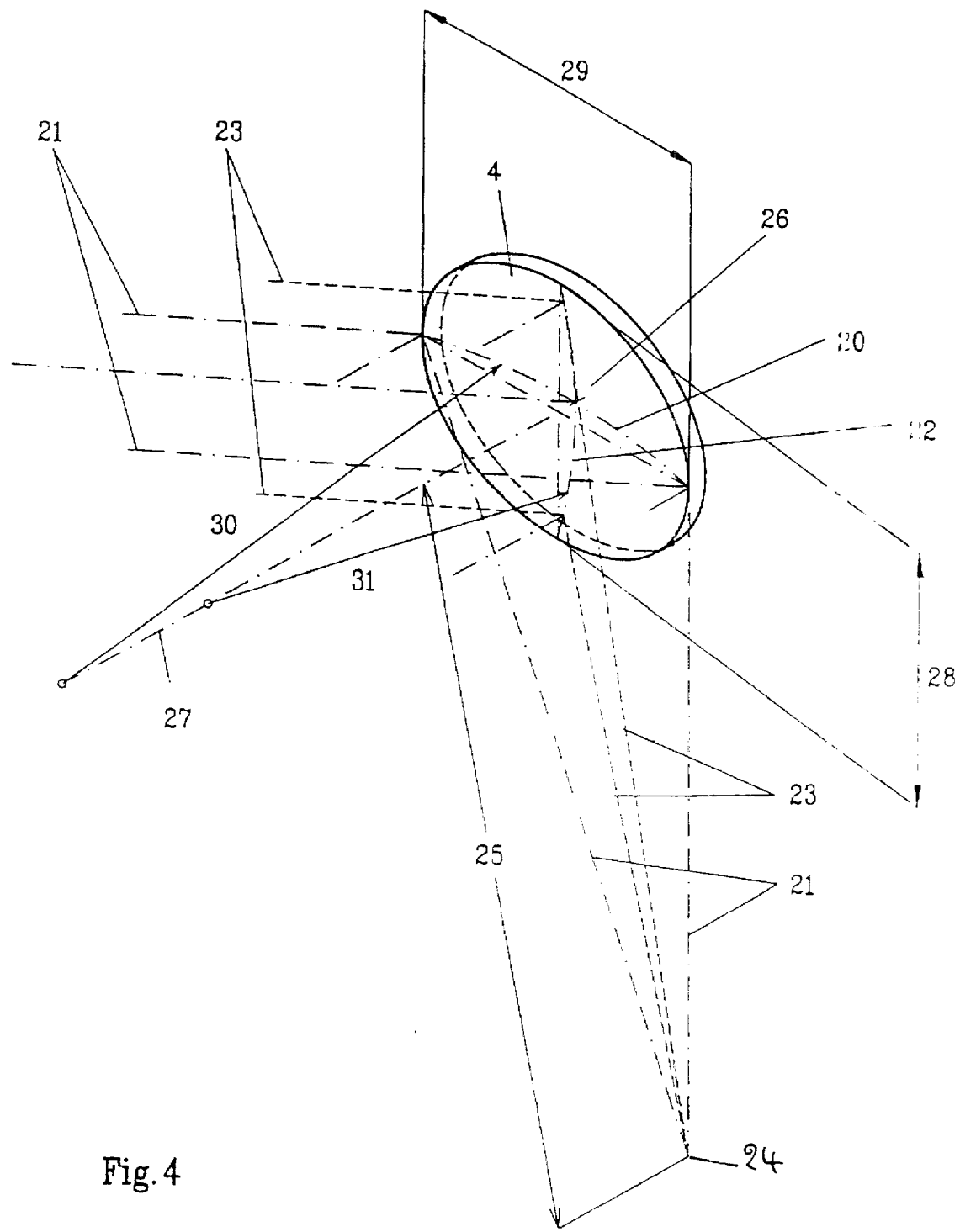
FIG. 4 shows a representation to explain the relationships in an elliptical or oval deflection mirror.

In FIG. 4, the concave mirror diaphragm is once more designated by the reference symbol 4. The meridional plane is bounded by drawn-in edge rays 21 and the sagittal plane by edge rays 23. Because of the large angle of incidence 13, the concave mirror diaphragm 4 is loaded by the laser beam 1 on a longer section along the curve of intersection 20 with the meridional plane than along its curve of intersection 22 with the sagittal plane. In the case of equal radii of curvature of the curves of intersection 20 and 22, the sectional width of the beam focal point in the sagittal plane would be larger than the sectional width in the meridional plane. These two sectional widths would be differentiated, under this precondition, by the factor cos α, where α is the magnitude of the angle of incidence 13 of the laser beam 1 with respect to the normal 27 at the vertex 26 of the concave mirror diaphragm 4.

According to a further aspect of the invention, therefore, the radius of curvature 30 of the curve of intersection 20 (meridional plane) is selected to be so much larger than the radius of curvature 31 of the curve of intersection 22 (sagittal plane) that the sectional widths 25 for the meridional plane and the sagittal plane are equal. The focal point is designated by 24, the axial diameters by 28, 29. Since these radii of curvature, according to earlier statements, are inherently established by a forcible bending in the center of the concave mirror diaphragm 4, the concave mirror diaphragm is now not of circular design but of elliptical or oval design.

Figure 5:
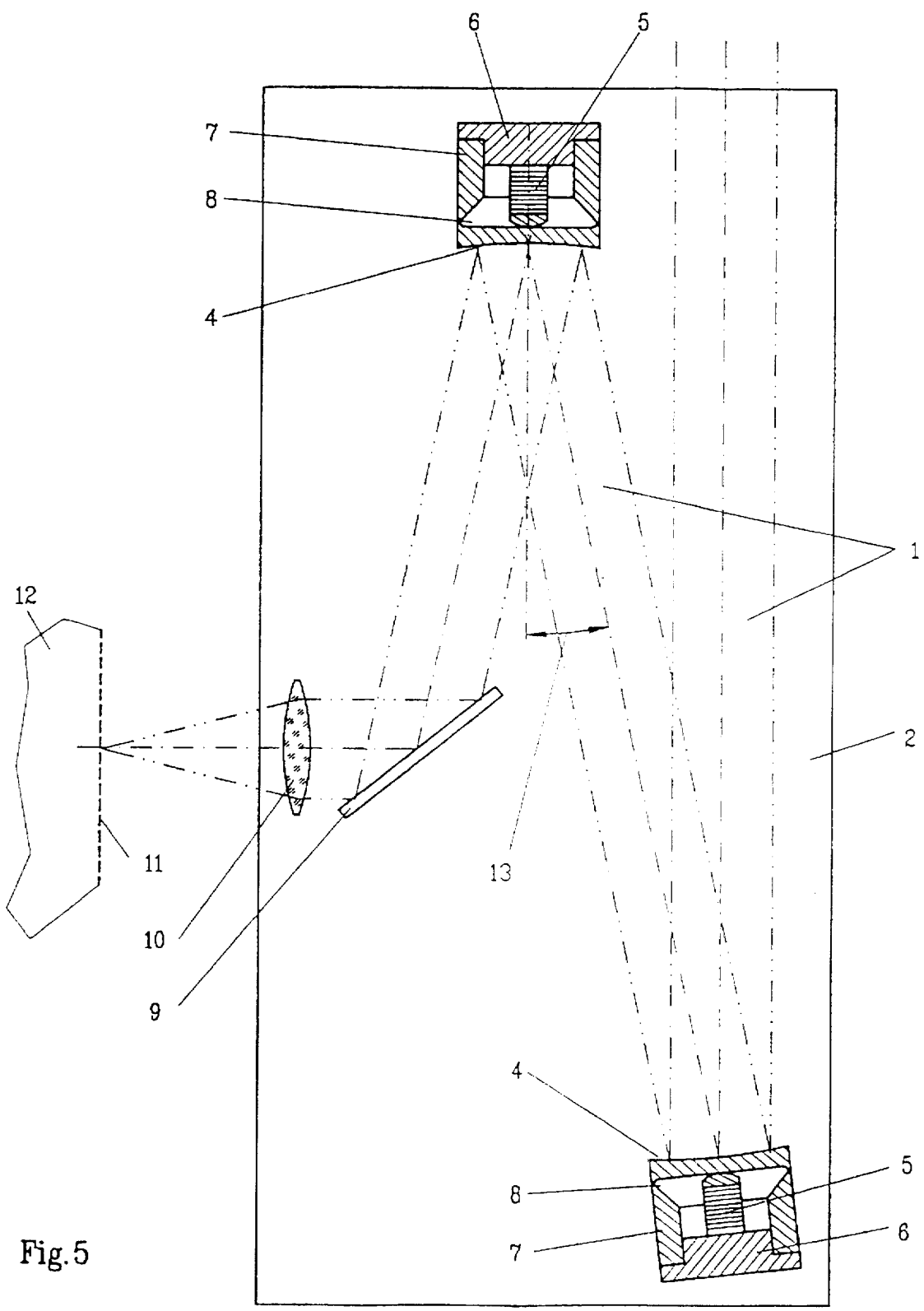
FIG. 5 shows a top view of a focusing apparatus according to a third exemplary embodiment of the invention.

A third exemplary embodiment of the invention is shown in FIG. 5, there being two concave mirrors with adjustable concave mirror diaphragms 4. Such an arrangement is selected either when the deviations to be readjusted become so large that the necessary actuating travel would exceed the permissible prolonged alternating strength or prolonged threshold strength of the material for the concave mirror diaphragms 4, including the reflective layers, or when actuating times are intended to be reduced still further. Since, in principle, the reciprocal values of the focal lengths in a combined optics unit add up to a common reciprocal value of the total focal length, the piezo-controlled focal length can also be halved by means of the double arrangement of concave mirror diaphragms 4 and, as a result, the readjustment travel can be increased. In a quite similar way it is true that for the n-fold arrangement of such concave mirror diaphragms, the readjustment travel can be increased n-fold.

Of course, using the focusing apparatus shown, a control of the size of the focal spot can also be carried out by displacing the waist of the beam. Thus, if any stencil engraving requires different diameters of the focus cross-section, this can be brought about by displacement of the waist of the beam within the actuating times common in the case of piezoelectric arrangements. Such an application is required, for example, in the field of half-tone technology.

In the case of the third exemplary embodiment according to FIG. 5, it is also possible to keep the angle of incidence (angle between the beam axis and the normal to the mirror diaphragm surface) and the angle of emergence and thus the total deflection of the beam path during the reflection at a concave mirror diaphragm relatively small. As a result, the amount of the error by which the focus in the sagittal plane differs from that in the meridional plane can be kept so small that it no longer interferes. Of course, the tolerance which is permissible for this depends on the respective application and, in particular, on the desired diameter of the focal spot.

Figure 6:
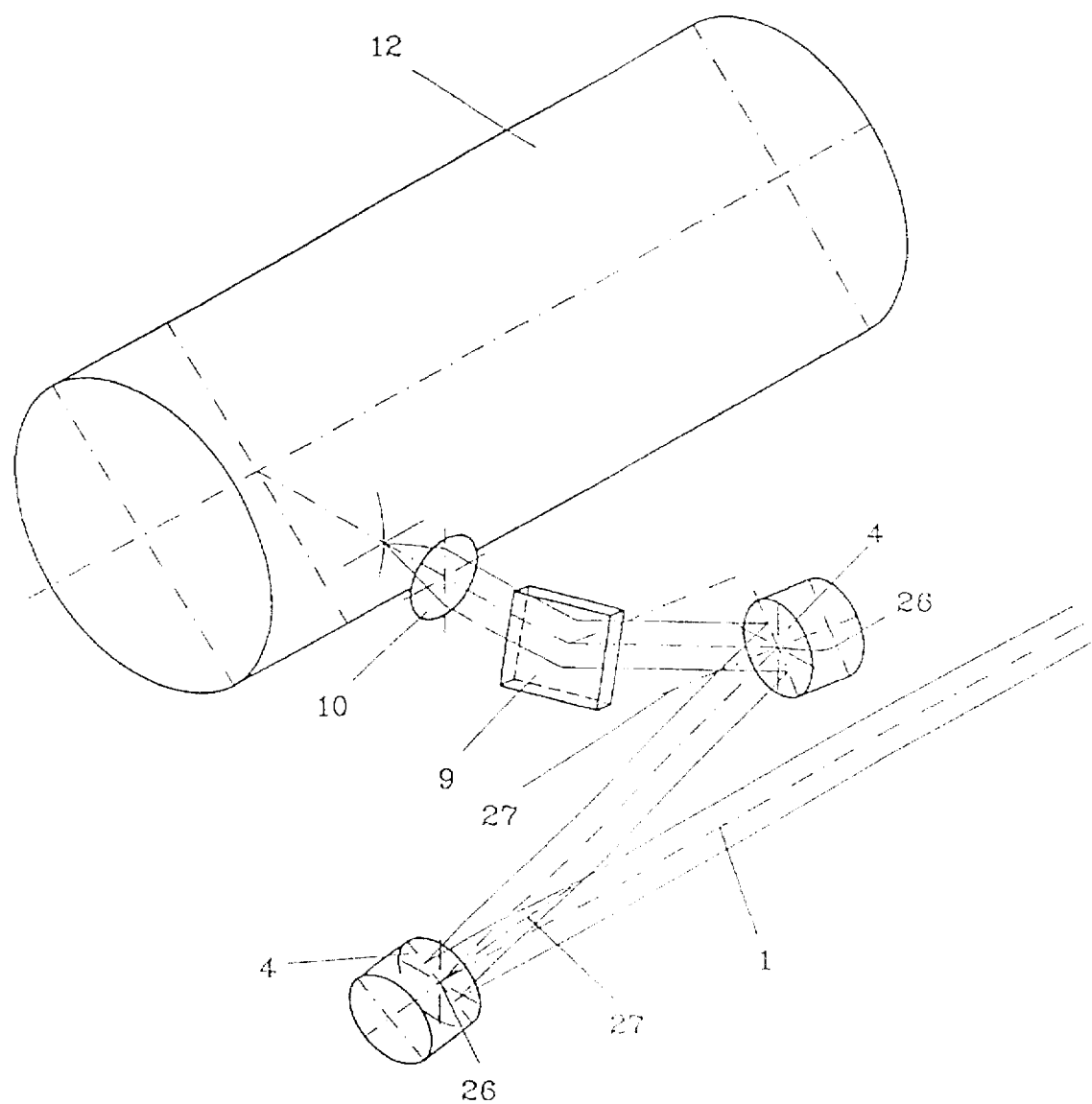
FIG. 6 shows a schematic view of a focusing apparatus according to a fourth exemplary embodiment of the invention.

A fourth exemplary embodiment of the invention is shown in FIG. 6. This is a further possibility for correcting the beam path when using two concave mirror diaphragms 4 to reduce the error in the deviation of the focal lengths of the sagittal and the meridional plane further. Here, the laser beam 1 no longer runs in one plane but is deflected spatially. The basic concept here is that, as a result of a spatial displacement of the two concave mirror diaphragms 4 and a corresponding tilting of their normals 27, the edge rays in two originally mutually perpendicular planes through the beam axis—for example the sagittal plane and the meridional plane—experience equally large deflections and a deviation of the focal lengths of these beam paths no longer occurs. This can be achieved by means of a spatial arrangement of two or more concave mirror diaphragms 4.

Figure 7:
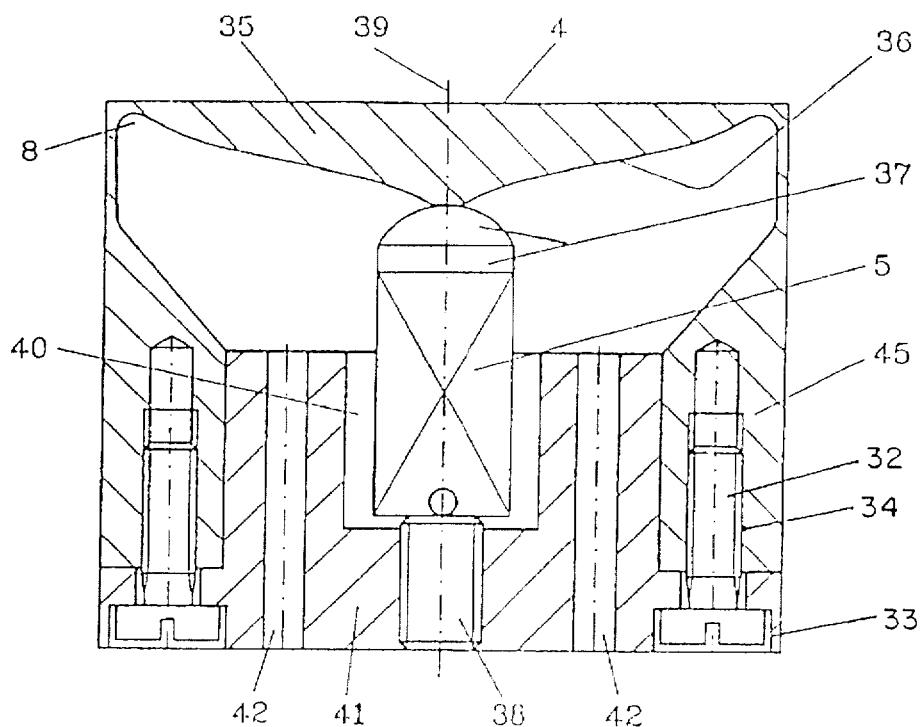
FIG. 7 shows an axial section through a deflection mirror of rotationally-symmetrical construction with a piezo element.
Figure 8:
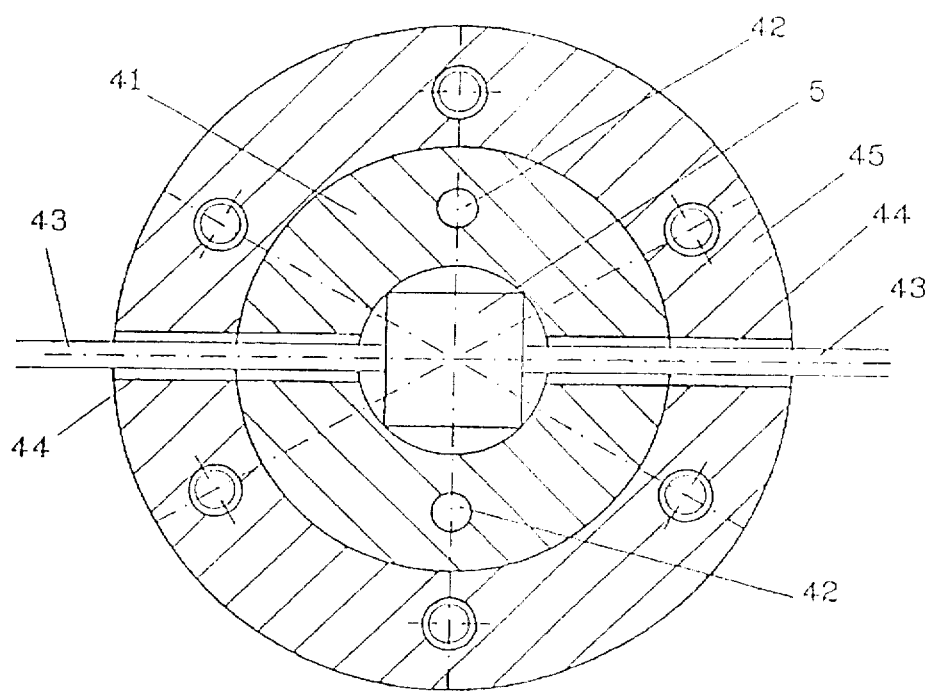
FIG. 8 shows an outline of the deflection mirror according to FIG. 7.

FIG. 7 shows an axial section through a mirror apparatus of rotationally-symmetrical construction, while FIG. 8 shows an outline of the mirror apparatus in FIG. 7. The curvature of the concave mirror diaphragm 4 is generally so small (peak height 15 μm to 20 μm) that it can only be shown as a straight line of intersection in a drawing which correctly reproduces the geometrical relationships. As a result of the action of the piezo element 5, the reflective surface of the concave mirror diaphragm must be deformed in a certain way. The angles of inclination of the normals with respect to the axis 39 must increase linearly with the radius measured out from this axis 39. However, in order that the wall 35 of the concave mirror diaphragm 4 deforms in this way, a strongly defined curve course must be maintained for the underside 36 of the wall 35, the said curve course being able to be determined, for example, numerically by means of a FEM analysis and being shown to scale in FIG. 7. Whether the piezo element 5 with the pressure piece 37 bonded thereto is adjusted via an adjusting screw 38 in the electrically voltage-free state with respect to the wall 35 until the originally spherically produced concave mirror diaphragm 4 is linear, or whether the piezo element 5 is pressed only lightly against this wall 35 and the spherical form of the concave mirror diaphragm 4 is in this case only slightly reduced, depends on the piezo element 5 used. Whether the piezo element expands or contracts under an applied electrical voltage is decisive for this. If the piezo element 5 contracts, it is adjusted with respect to the wall 35 until the concave mirror diaphragm 4 shows a straight-line course. By means of the application of an electrical voltage, the piezo element 5 then contracts and the concave mirror diaphragm 4 finally reaches, at full electrical voltage, virtually that course which it originally had. Of course, in each case a slight mechanical pretension can be left, so that the piezo element 5 together with the pressure piece 37 bonded to its end is always held with sufficient force between wall 35 and adjusting screw 38. A cavity 40 between the piezo element 5 and a sealing lid 41 can be filled with an elastic resin. As a result of absorption of the laser radiation and also as a result of capacitive heating of the piezo element 5, the temperature of the apparatus rises. Hence, a cooling medium (air, silicone oil, etc.) can be supplied and led away again through holes 42 in the sealing lid 41. If this cooling medium is a liquid, a mechanical damping effect can also be exerted on the wall 35 in the case of rapid actuating movements. Electrical connection 43 of the piezo element 5 are led out through holes 44 which penetrate both the sealing lid 41 and a housing cover 45. In the case of a liquid cooling medium, these holes 44 are likewise sealed off with an elastic resin or a cast compound.

The concave mirror diaphragm 4 and the housing cover 45 are here integrally connected to each other and form a kind of cylindrical pot. In this arrangement, the concave mirror diaphragm 4 represents the bottom of this pot. The pot is sealed with the aid of the sealing lid 41, specifically with the aid of screws 32 which project through openings 33 in the outer peripheral edge of the sealing lid 41 and are screwed into blind threaded holes 34 which are located in the wall of the housing cover 45.

The piezo element 5 is located coaxially to the central pot axis 39 and extends in its longitudinal direction. The axes of the holes 42 and of the screws 32 run parallel to this. The pressure piece 37 of the piezo element 5 acts on the rear side of the concave mirror diaphragm 4, likewise on the central axis 39, the concave mirror diaphragm 4 having its greatest thickness on the central axis 39 and extending to the furthest extent into the pot interior. Proceeding from the central axis 39, seen in the radial direction, the thickness of the concave mirror element 4 decreases sharply at first, corresponding to a predetermined course, and then less sharply and passes through a point of inflection in order subsequently to decrease further until the turned grooves 8, already mentioned at the outset, are reached which run in the pot peripheral direction on the inside of the pot bottom.

Figure 9:
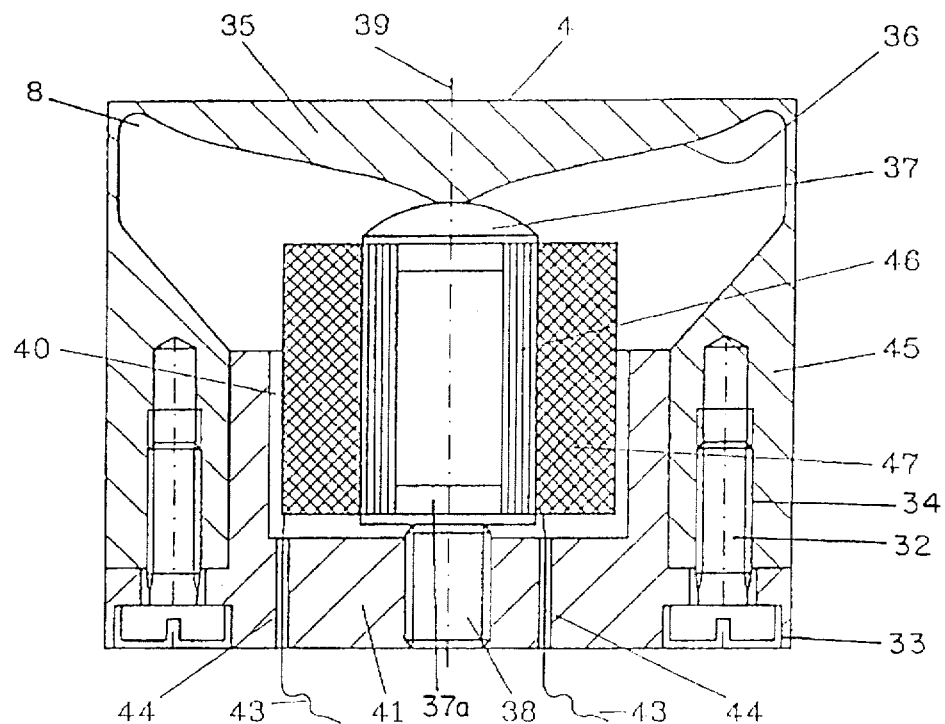
FIG. 9 shows an axial section through a deflection mirror of rotationally-symmetrical construction with a magnetostrictive element.
Figure 10:
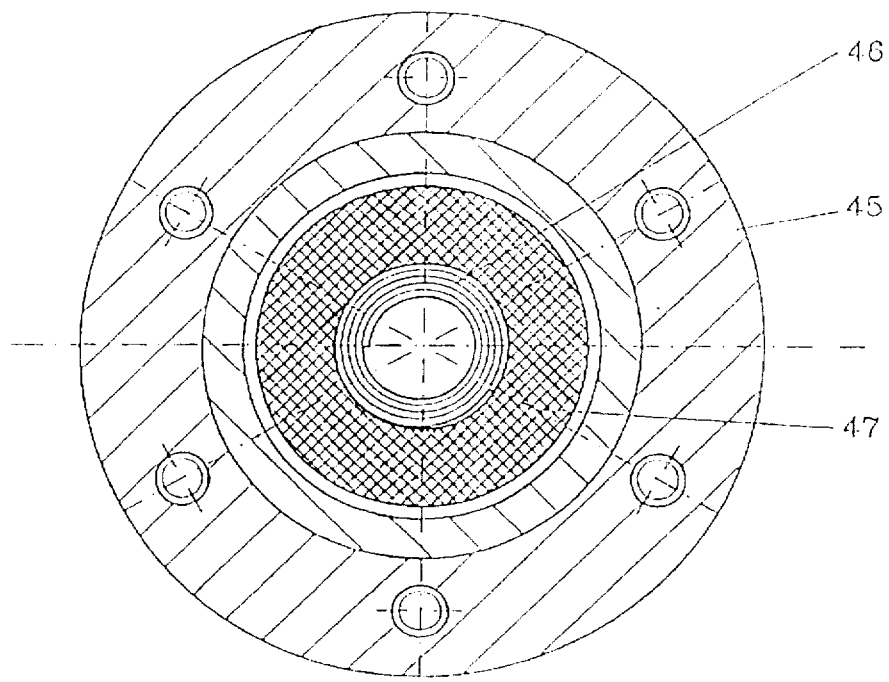
FIG. 10 shows an outline of the deflection mirror according to FIG. 9.

FIGS. 9 and 10 show a mirror apparatus having a magnetostrictive displacing element. In this case, FIG. 9 is an axial section through the mirror apparatus, while FIG. 10 shows an outline. Here, too, the mirror apparatus is once more of rotationally-symmetrical construction and otherwise the same reference symbols apply as in FIGS. 7 and 8. A thin metal sheet of pure nickel is wound here in a spiral shape to form a concave approximately circular-cylindrical core piece 46 which is surrounded by a coil former 47. Turns of the coil former 47 which are wound coaxially to the central axis 39 are connected to electrical connections 43 which are led to the outside via passage holes 44. If an electrical voltage is applied to these electrical connections 43, a current then flows through the turns of the coil former 47, so that the core piece 46 contracts as a result of the influence of the magnetic field which is built up.

This hollow-cylindrical core piece 46, as already mentioned, is located with its cylinder axis coaxial to the central axis 39 of the mirror apparatus. In this arrangement, the pressure piece 37 is inserted firmly into the core piece at the top. At the bottom, the core piece is seated with its other end on an attachment 37a which is acted upon, for its part, by the adjusting screw 38. The coil former 47 is located on the outside of the core piece 46, coaxial to this or to the central axis 39, with its turns led around the core piece 46. Otherwise, the construction of the mirror body according to FIGS. 9 and 10 corresponds to the construction of the mirror body according to FIGS. 7 and 8.

Figure 11:
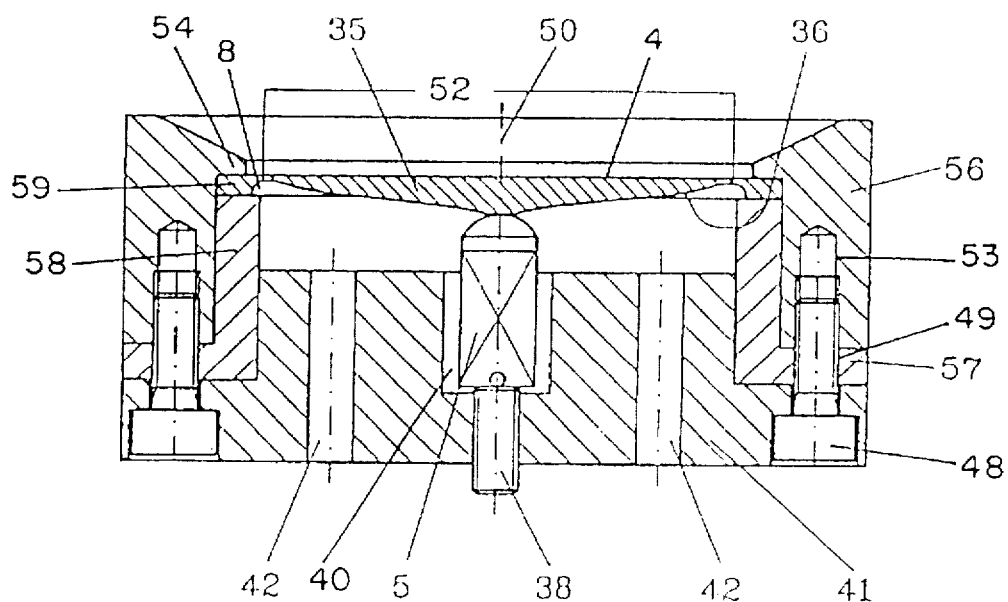
FIG. 11 shows a section through a deflection mirror having an elliptical mirror diaphragm, along the long ellipse axis.
Figure 12:
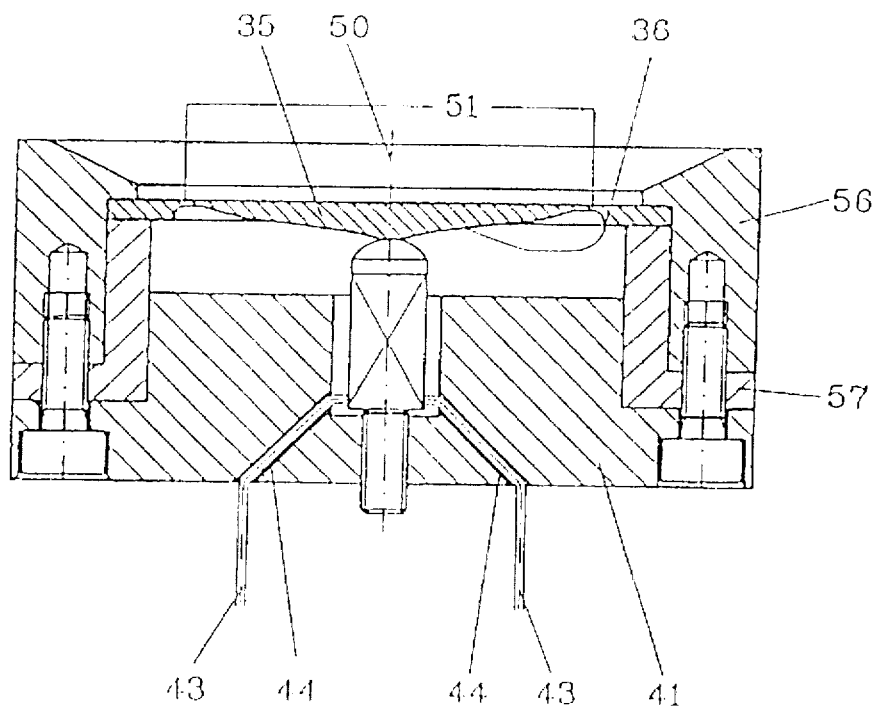
FIG. 12 shows a section through the deflection mirror according to FIG. 11 along the short ellipse axis.
Figure 13:
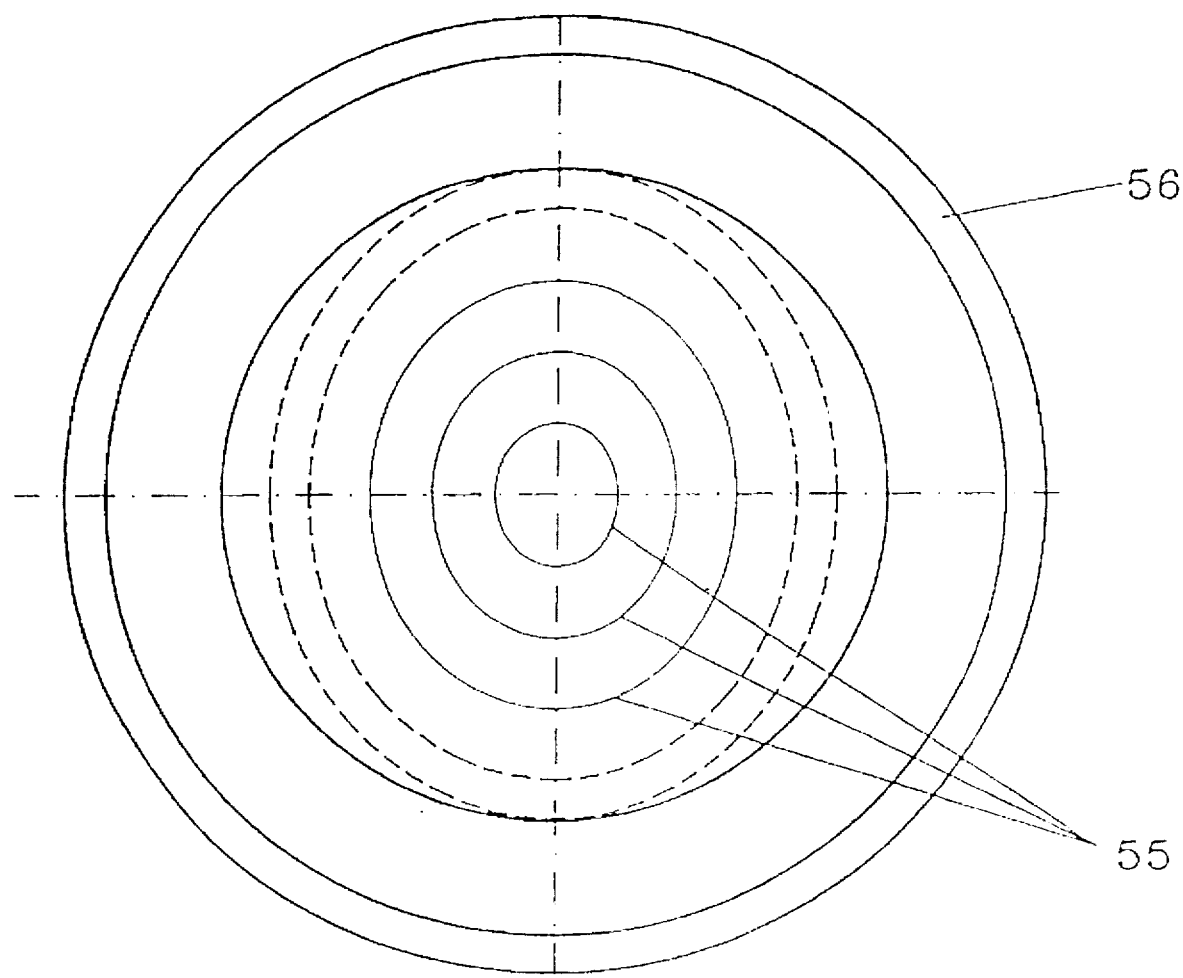
FIG. 13 shows a top view of the deflection mirror according to FIGS. 11 and 12.

FIGS. 11, 12 and 13 show a mirror apparatus which is equipped with a concave mirror diaphragm 4 which is elliptical in outline. This concave mirror diaphragm 4 has different diameters 51, 52 of the flexurally active diaphragm zone in two mutually perpendicular sections through the central axis 50. Since it is difficult in terms of manufacture to make such a diaphragm shape in the interior of a hollow body, the diaphragm is constructed as a wafer and receives its correct shape in terms of deformation analysis by shaping machining of the rear side. The rear side 36 of the wall 35 also shows here once more the characteristic reducing course of the wall thickness with increasing radius, but contour lines 55 of this rear side 36 are not circles here but ellipses or ovals. This can best be seen in FIG. 13. The concave mirror diaphragm 4 is finally clamped between an outer ring part 56 and a frame 57. The sealing lid 41, as before, holds the piezo element 5. In the present case screws 48 are pushed through marginal passage openings of the sealing lid 41 and, in addition, pushed through marginal passage openings 49 in a flange of the frame 57 and screwed into corresponding threaded holes 53 which are located in the wall region of the outer ring part 56. This outer ring part 56 has an inner flange 54 on the interior of which the concave mirror diaphragm 4 rests. It is pressed against this inner flange with the aid of the frame 57. In this arrangement, the frame 57 has, coaxial to the central axis 50, a hollow cylinder 58 which is seated with a push-fit in the outer ring part 56 and presses with its end against a peripheral section 59 of the concave mirror diaphragm 4 which lies outside the turned groove 8, seen in the radial direction. The sealing lid 41, as before, holds the piezo element 5. A space 40 between the piezo element 5 and the sealing lid 41 can once more be filled with a suitable cast compound. Otherwise, the same designations as in FIGS. 7 to 10 apply.

Figure 14:
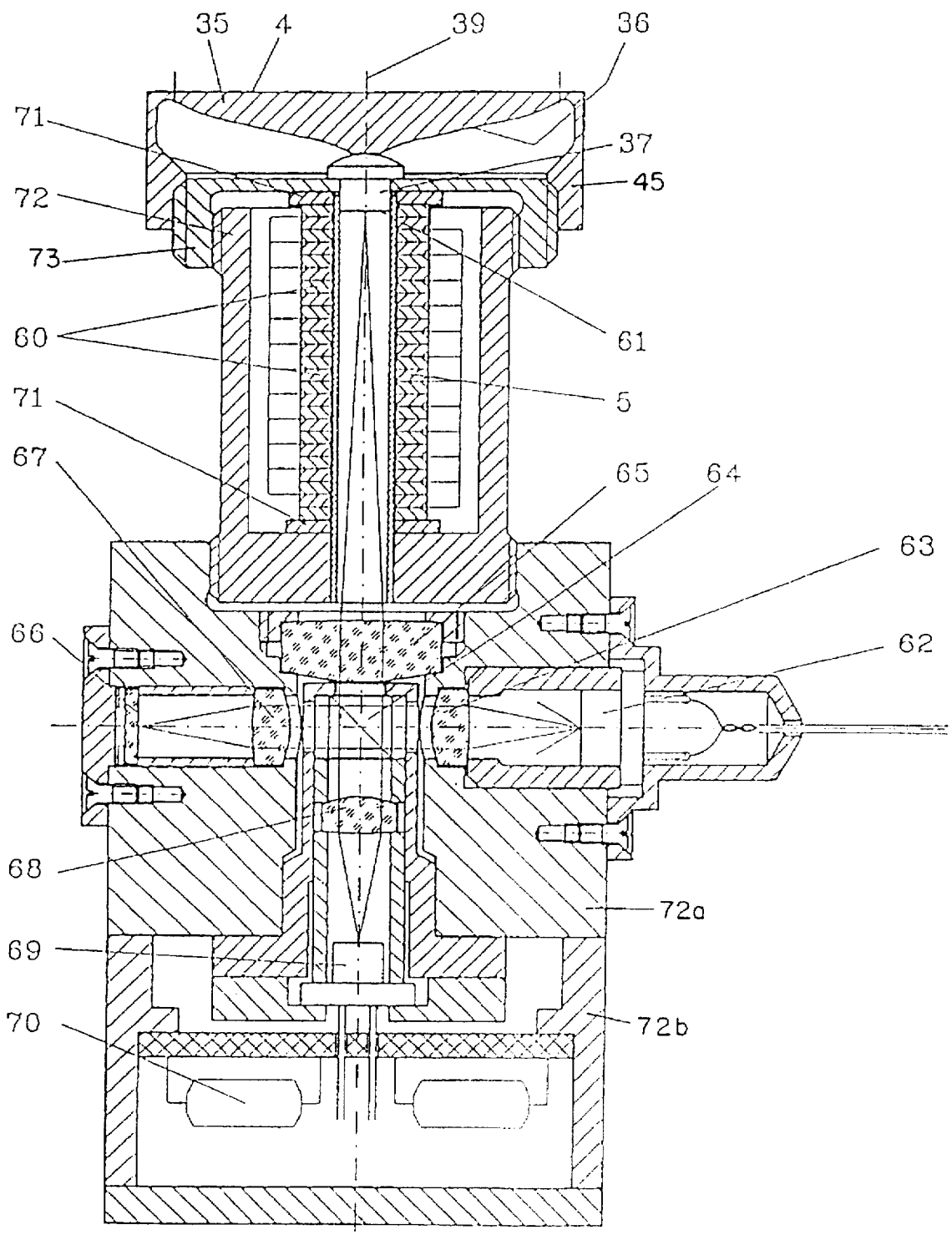
FIG. 14 shows an axial section through a piezoelectrically actuated deflection mirror with an optical position detector apparatus.

FIG. 14 shows a piezoelectrically actuated mirror apparatus, in which the actual positional alteration which has occurred can be established via an interferometric measuring device. The piezo element 5 is composed of small annular discs 60 which form a hollow cylinder lying coaxial to the central axis 39. The pressure piece 37 is inserted at the top with its end in this hollow cylinder and carries on its rear side an optical mirror 61 which points into the interior of the hollow cylinder. A laser diode 62 sends a bundle of light, via a lens 63 (achromat), to a beam splitter 64, which focuses 50% of the light intensity via a lens 65 (achromat) onto the mirror 61 on the rear side of the pressure piece 37, and permits the other 50% of the light intensity to be incident on a stationary mirror surface 66 via a lens 67. The beams reflected from the mirror 61 and from the mirror 66 run once more via the beam splitter 64 and, from each of these, 50% of the intensity is focused via a further lens 68 onto a photodiode 69. In the case of positional alterations of the pressure piece 37, interferences are produced on the surface of the photodiode 69, which trigger a correspondingly variable diode current. This is preamplified by an amplifier circuit 70 to the extent that it can be forwarded to evaluation logic, not shown any further. This evaluation logic evaluates the information communicated in a manner known per se, for example by counting the light/dark events, and, if necessary, additionally measures the voltage in order to obtain a finer resolution. The piezo element 5 is insulated from the metallic housing 72 by ceramic discs 71, this metallic housing 72 having on its bottom end side a central passage opening for the passage of the light beam passing to the mirror 61. At the top or at the other end side the metallic housing 72 is closed off by means of an end diaphragm 73 which is screwed onto a top external thread on the housing 72. The end diaphragm 73 has a central passage opening for the accommodation of the pressure piece 37. The piezo element 5 is thus enclosed by the housing 72 and the end diaphragm 73. This end diaphragm 73 is of relatively thin design in order to hamper its longitudinal expansion as little as possible.

On the end diaphragm 73, the housing cover 45 for the concave mirror diaphragm 4 is screwed onto a corresponding outer peripheral thread via a corresponding internal thread. The housing cover 45 is also here connected integrally to the concave mirror diaphragm 4, which contacts the pressure piece 37 with its central inner attachment. At the other end, the housing 72 is inserted or screwed into a carrier housing 72a. The previously mentioned optical elements 63, 64, 65, 66, 67 and 68 are located in the respective optical channels in this carrier housing 72a, the laser diode 62 and the photodiode 69 also being attached to this carrier housing 72a. The photodiode 69 is connected to the amplifier circuit 70 which is located in a housing part 72b which is connected to the housing part 72a.

Figure 15:
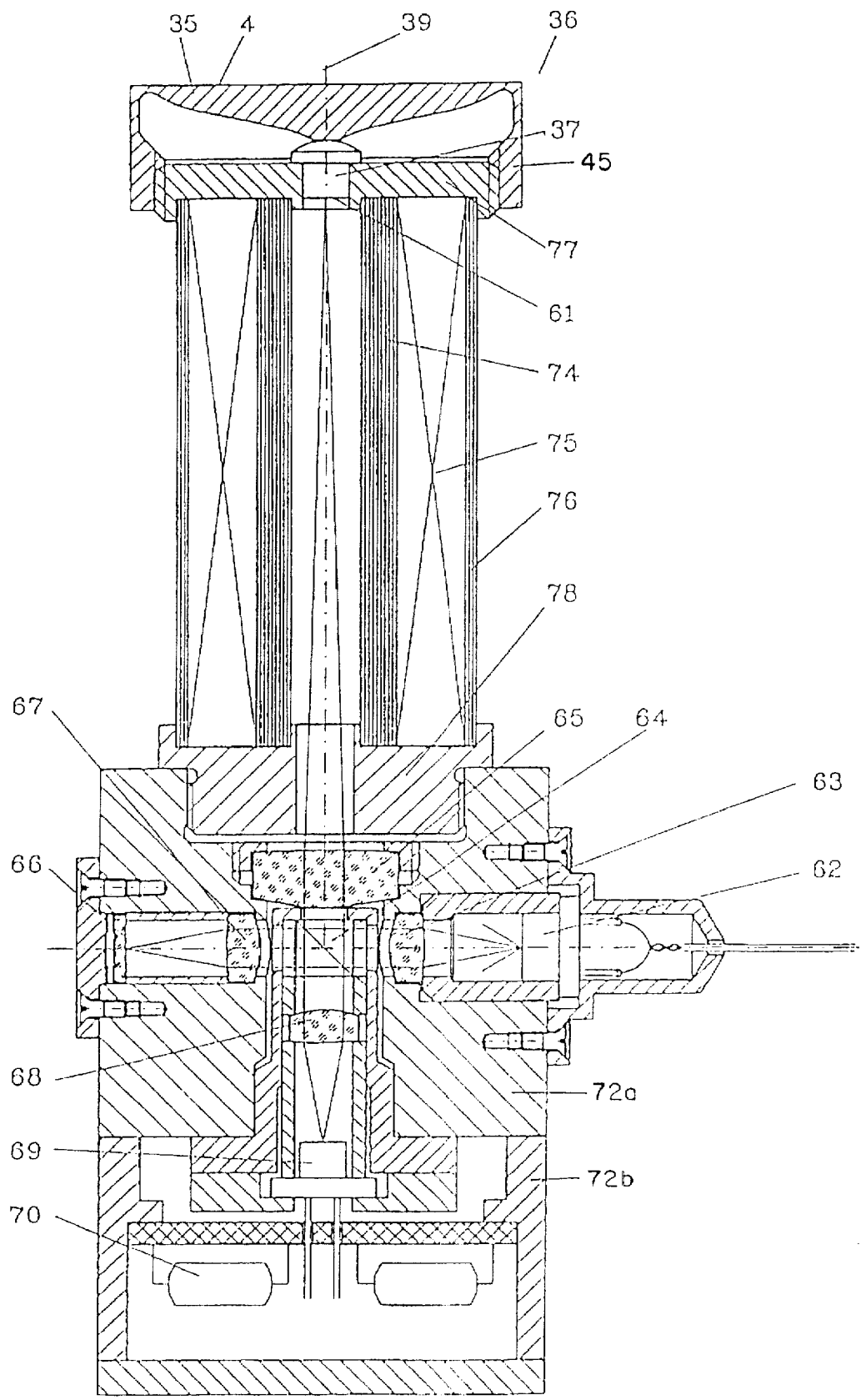
FIG. 15 shows an axial section through a magnetostrictively actuated deflection mirror with an optical position detector apparatus.

FIG. 15 shows in principle the same apparatus as in FIG. 14, but there is now a magnetostrictive actuating element. An inner hollow cylinder 74 is formed by a thin nickel sheet-metal strip which is wound in a spiral shape and bonded by means of epoxy resin. This hollow cylinder 74 is enclosed by a wound assembly 75 and this wound assembly 75 by an outer hollow cylinder 76. This outer hollow cylinder 76 can be constructed in the same way as the inner hollow cylinder 74. Housing end discs 77 and 78 are bonded or cast at the ends together with the hollow cylinders 74 and 76 and the wound assembly 75. In this arrangement, the housing end disc 77 has a central passage opening for the accommodation of the pressure piece 37 which carries on its lower side the mirror 61 which points into the interior of the hollow cylinder 74. The housing end disc 78 is provided with a central passage opening through which the beam is incident on the mirror 61. In this case, the housing end disc 78 is screwed into the carrier housing 72a via a suitable peripheral outer thread. The housing wall 45, to which the concave mirror diaphragm 4 is connected integrally, is in turn screwed onto the upper housing end disc 77.

As a result of the influence of a relatively strong or relatively weak current through the wound assembly 75, or as the result of the influence of the associated magnetic field, the hollow cylinders 74 and 76 expand or contract and thus displace the concave mirror diaphragm 4.

Figure 16:
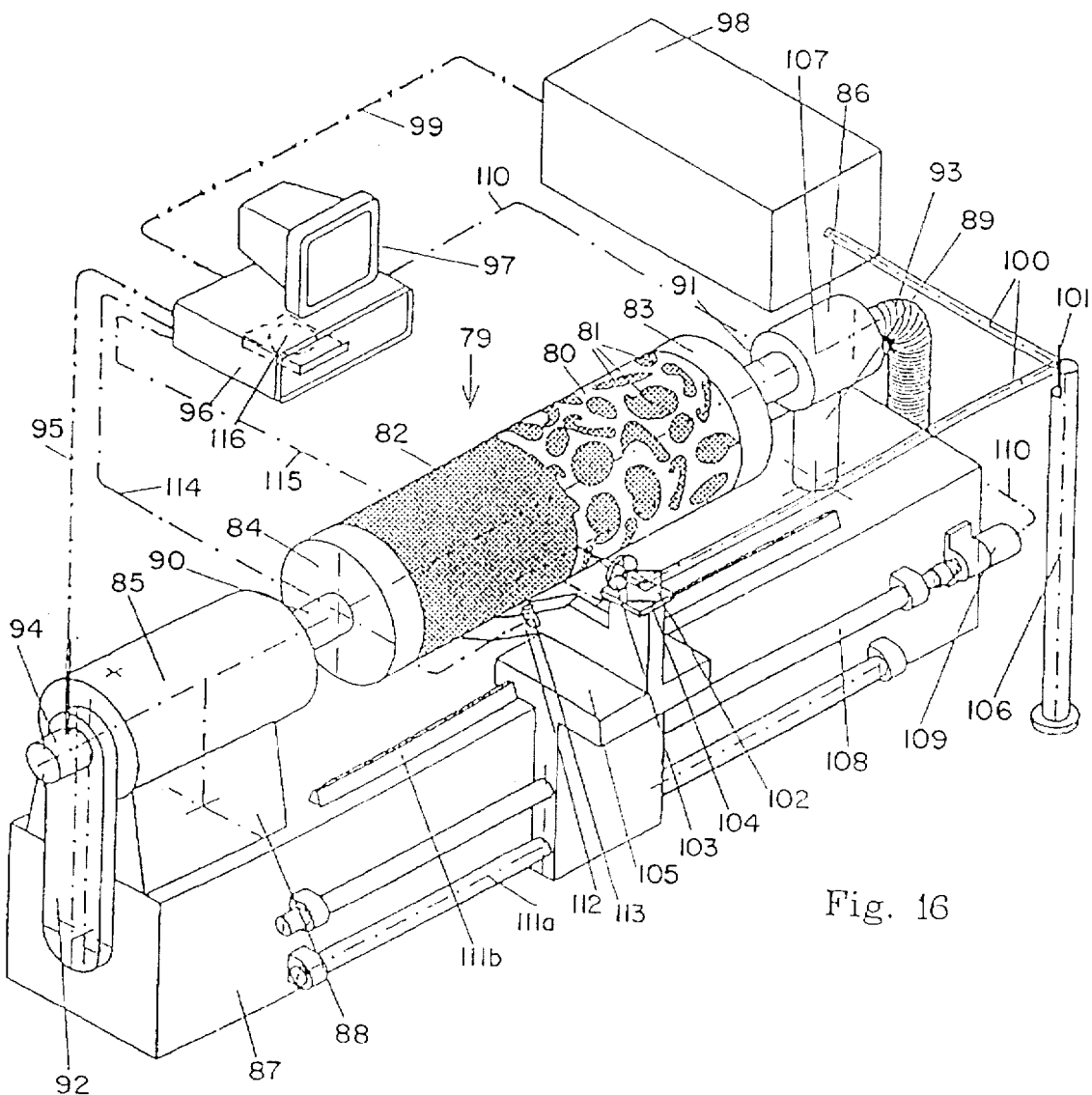
FIG. 16 shows a schematic representation of the entire construction of a laser engraving apparatus having a laser beam focusing apparatus according to the invention.

The overall construction of the device according to the invention, which is used for example for the production of screen printing stencils, will be described in more detail below with reference to FIG. 16.

A screen printing stencil carries the reference symbol 79, while the hollow cylinder is provided with the reference symbol 80. On the latter there is a stencil pattern 81, specifically within a lacquer or other light-sensitive layer 82 which is present on the outer peripheral surface of the hollow cylinder 80. The hollow cylinder 80 is in this case, for example, an evenly perforated nickel cylinder.

The screen printing stencil 79 is held at its mutually opposite ends by in each case a clamping head 83 and 84, which are designed as centring flanges. These clamping heads 83, 84 are in each case rotatably supported in a bearing shell 85, 86. The bearing shells 85, 86 are supported on a machine bed 87, to be specific via supporting apparatus 88, 89.

The supporting apparatus 89 can be removed from the machine bed 87 or can be displaced relative to this in the longitudinal direction of the screen printing cylinder 79, so that the latter can be more easily positioned between the clamping heads 84, 83 or can be removed once more from the region lying between them.

A hollow shaft section 90 which is connected to the left-hand clamping head 84 extends into the bearing shell 85 and is rotatably supported there. This hollow shaft section 90 is set into rotation via a drive train which runs through the supporting apparatus 88 as far as a drive motor which is arranged in the machine bed. When the hollow shaft section 90 is rotated, the clamping head 84 is carried along by it, so that the screen printing stencil 79 is set into rotation as a result. The other clamping head 83 rotates freely and is supported in the bearing shell 86 via a hollow shaft section 91.

Both hollow shaft sections 90 and 91 end in the region of the clamping heads 84 and 83, respectively, that is to say they do not extend into the screen printing stencil 79, and are also connected in a sealing fashion to flow channels 92 and 93 at their ends facing away from the clamping heads 84, 83.

An angle encoder 94 connected to the free end of the hollow shaft section 90 informs a computer 96 with associated monitor 97, via a control line 95, about the respective rotational position of the screen printing stencil 79. In the process, the computer 96 outputs corresponding switch-on or switch-off pulses to a laser 98 via a control line 99. A laser beam 100 from the laser 98 is emitted or not emitted according to these switch-on and switch-off pulses. The laser beam 100 is fed via a first deflection mirror 101 to a second deflection mirror 102 which is mounted together with a focusing lens 103 on an optical slide 104 which is arranged movably on a displacing slide 105. The displacing slide 105 is supported, as will be explained further, indirectly on the machine bed 87, which stands for example on the floor, just like a stand 106 for holding the first deflection mirror 101.

In the region between the first deflection mirror 101 and the second deflection mirror 102, the laser beam 100 runs parallel to the cylinder axis 107 of the screen printing stencil 79 and is deflected by the second deflection mirror 102 in such a way that it runs at least approximately radially towards the hollow cylinder 80. In so doing, it is focused by the focusing lens 103 onto the lacquer layer 82.

The displacing slide 105 can be displaced in the direction of the cylinder axis 107 of the screen printing stencil 79. This displacement is effected by means of a spindle 108 and a motor 109 driving this spindle. A cylindrical guide 111a and a prismatic guide 111b ensure a movement of the displacing slide 105 which is exactly parallel to the cylinder axis 107 of the screen printing stencil 79. In this arrangement, the prismatic guide 111b is located on the upper surface of the machine bed 87, while the spindle 108 and the cylindrical guide 111a are arranged parallel to each other on the front side of the machine bed 87.

Within the machine bed 87 there are gas conveying devices, one of which in each case is connected to one of the flow channels 92 and 93. By means of these gas conveying devices, a compressed gas can be blown via the flow channels 92, 93, the hollow shaft sections 90, 91 and the clamping heads 84, 83 into the interior of the screen printing stencil 79. A sealing means can also be blown with the gas into the interior of the screen printing cylinder 79, in order to seal off from the inside openings in the hollow cylinder 80 which are freed from the lacquer layer 82, if this is necessary. The sealing means can be, for example, scraps of material, for example scraps of paper, or small pieces of plastic, and the like, which can also have a reflective surface.

The motor 109 for driving the spindle 108 is preferably a stepping motor, so that the axial position of the laser beam 100 which is incident on the hollow cylinder 80 can also be determined by means of the drive pulses for the stepping motor 109. Corresponding drive pulses are received by the stepping motor 109 from the computer 96 via a line 110.

Connected to the displacing slide 105 is, for example, in one piece, a bracket 112 which is located underneath the screen printing stencil 79 and surrounds the latter at a distance, for example in the manner of a part-circle or semicircle. When the slide 105 is moved in the direction of the cylinder axis 107, the bracket 112 is thus correspondingly moved with it. Fastened on the bracket 112 or let into the latter is a distance sensor 113 which, aligned radially with respect to the screen printing stencil 79, measures the distance between itself and the surface of the screen printing stencil 79 or the hollow cylinder 80. The distance measurement signals pass via a line 114 to the computer 96. By means of this distance sensor 113, in a fixed measuring position, radial deviations of the actual position of the wall of the hollow cylinder 80 from its ideal position are measured for a multiplicity of peripheral positions of the hollow cylinder 80 when this is rotated. The respective measurement signals are then processed in the computer 96, in order to determine from the measured distances between sensor and hollow cylinder surface the radial positional deviations at the location of the point of incidence of the laser beam 100 on the hollow cylinder, specifically taking into account the angle of rotation between sensor and laser beam point of incidence. From this, actuating signals are obtained which are used to keep the focus of the laser beam 100 always in the region of the lacquer layer 82, which is carried out by means of corresponding displacement of the mirror 102. The actuating signal for displacing the mirror 102 is fed to the latter via a line 115 by the computer 96, which is also equipped with a data memory 116, for example a cassette. Stored in this data memory are the optomechanical values of the mirror 102, for example in the form of tables for various focal positions, so that corresponding actuating signals can be determined or calculated using these tables if the distances determined by means of the sensor are prescribed.

Unfortunately, thin-walled screen printing stencils are not ideal circular-cylindrical bodies. They exhibit deviations from the ideal shape of the circular cylinder both in their longitudinal extent and in their cross-section, which prevent the application of a pattern in an accurately fitting manner and require that these rotational deviations be made undamaging in terms of their effects, for example by means of measurement and the introduction of suitable corrective measures.

In the case of a typical laser engraving apparatus, the screen printing cylinder rotates at about 1200 revolutions per minute, that is to say with an angular frequency of 15 to 20 Hz. In the case of a Fourier analysis of the rotational deviations occurring, if elements above the 100th order are neglected, it is necessary to carry out the readjustment of the focal point of the laser beam 100 at a frequency of up to 2 kHz. This can readily be carried out using the deflection mirror according to the invention, which is the deflection mirror 102 in FIG. 16. Its operating frequency could readily be increased to 6 kHz. Of course, the combination of deflection mirror 102 and focusing lens 103 shown in FIG. 16 can also be replaced by any other of the previously described lens-deflection mirror combinations. In this arrangement, the distances between mirror and lens system are of the order of magnitude of the respective focal lengths, so that the relationship (1) mentioned at the outset for the total focal length of a combined lens-mirror system is satisfied. Normal angles of incidence preferably lie in ranges from 5° to 45°.

Figure 17:
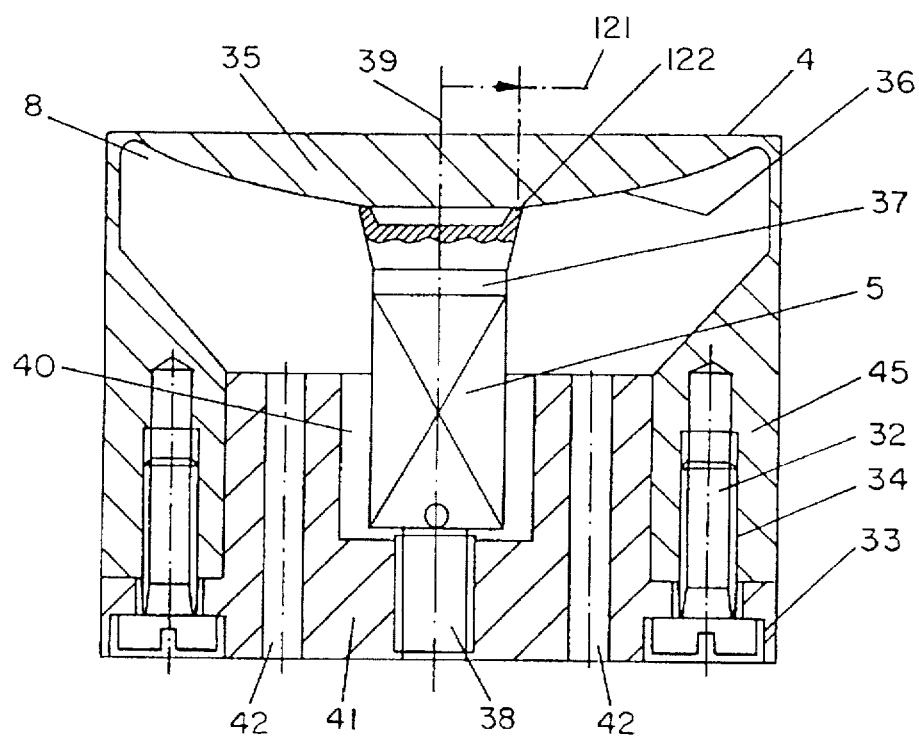
FIG. 17 shows a section through a deflection mirror having an annular blade.

FIG. 17 shows an exemplary embodiment in which the rear side 36 of the wall 35 of the mirror diaphragm 4 is no longer acted upon by a central actuating force, rather this actuating force here acts on a circle having a radius 121 which differs from zero. For this purpose, an annular blade 122, which acts on the underside 36 of the wall 35, is constructed on the pressure piece 37. Since, above this radius 121, the wall 35 is free of transverse forces acting in the wall, the underside 36 must have a different course of its contour for radii which are smaller than the radius 121 than for radii which are greater than the radius 121. The correct shaping of the contour of the wall 35 inside the radius 121 can be determined by means of a FEM analysis, as has already been described earlier.

Figure 18:
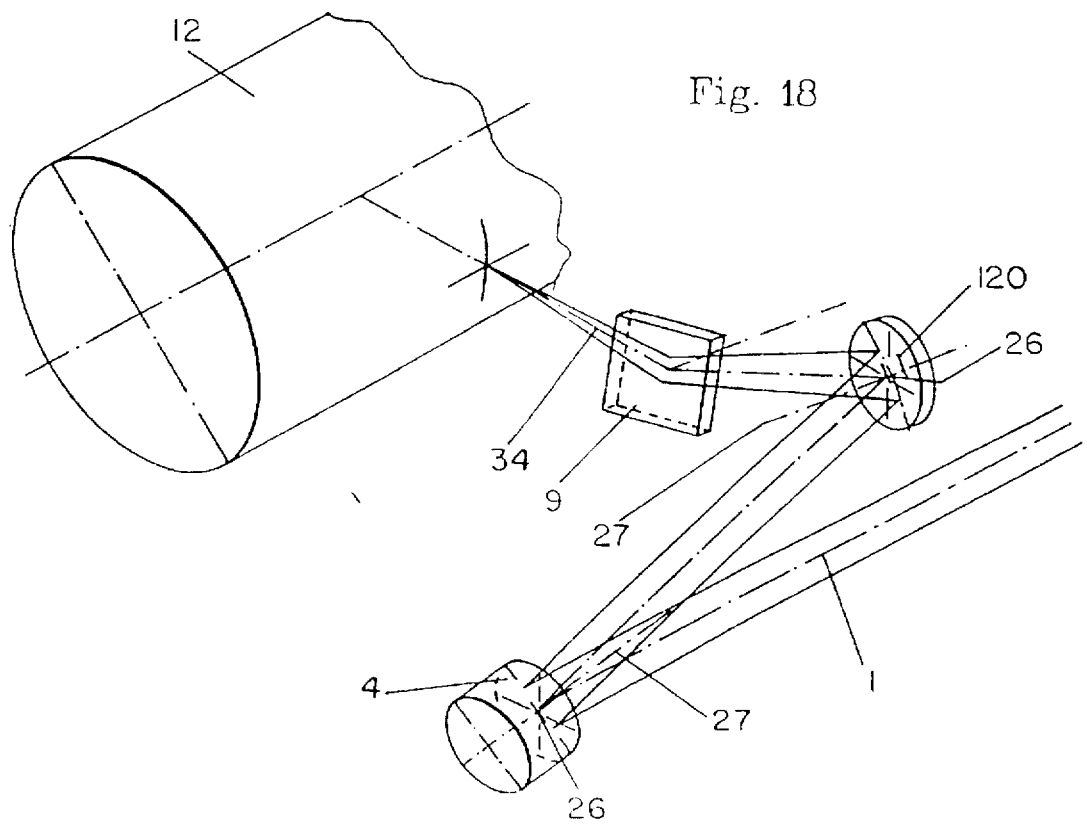
FIG. 18 shows a perspective representation of a further focusing apparatus according to the invention.

FIG. 18 shows a design of the laser focusing optics which exclusively uses surface mirrors. The laser beam 1 is initially deflected by a piezo-controlled concave mirror diaphragm 4, already indicated, and is fed to a concave mirror 120 which has a much greater curvature of its reflective surface than the concave mirror diaphragm 4. In the case of the concave mirror 120, in order to avoid large angles of incidence and hence severe astigmatism, a further deflection mirror 9 is provided which is of planar design and which ensures the deflection of the now already focused laser beam onto the stencil 12. The direction of the laser beam 1 here runs from this last deflection essentially along the surface normal through the engraving point on the stencil 12. However, in special cases this direction can also be otherwise selected. For example, if a different engraving width is desired in the peripheral direction of the stencil from that in the axial direction of the stencil, the laser beam 1 can have imparted to it a different direction of incidence on the stencil. Of course, the concave mirror 120 can also be of such a design that it undergoes an alteration of its curvature by virtue of a controlled piezo element arranged in its interior. The radii of curvature of this concave mirror 120 will then be altered only very slightly in the case of the small actuating travel of the piezo elements. Both concave mirrors 26, 120 can also lie in different planes, as has already been described in conjunction with FIG. 6.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A device for producing a printing stencil comprising:
   means for rotatably supporting a printing cylinder;
   a light source for generating a light beam incident on the printing cylinder;
   means for displacing said light beam in a longitudinal direction of the printing cylinder;
   focusing optics to focus the light beam onto a surface of the printing cylinder, said focusing optics having at least one deflection mirror with an elastically deformable mirror diaphragm;
   at least one sensor which measures a distance between itself and the surface of the printing stencil;
   an actuating signal generator which generates an actuating signal as a function of the measured distance; and
   actuating means for setting a curvature of said mirror diaphragm as a function of said actuating signal.

2. The device according to claim 1, wherein said actuating means are piezoelectric actuating means.

3. The device according to claim 1, wherein said actuating means are magnetostrictive actuating means.

4. The device according to claim 1, wherein said mirror diaphragm is of circular design.

5. The device according to claim 1, wherein said mirror diaphragm is of at least one of an oval and an elliptical design.

6. The device according to claim 1, wherein said actuating means acts on a central rear part of said mirror diaphragm.

7. The device according to claim 1, wherein said actuating means includes an annular blade acting on a rear side of said mirror diaphragm.

8. The device according to claim 1, wherein said mirror diaphragm, as a result of suitable shaping of its rear side by said actuating means, is thicker in the center than at its edge.

9. The device according to claim 8, wherein the rear side of said mirror diaphragm has at least one point of inflection between its center and its edge.

10. The device according to claim 1, further comprising an actuating means housing for containing said actuating means and being integrally connected to an edge of said mirror diaphragm.

11. The device according to claim 1, further comprising an actuating means housing containing said actuating means and having actuating means housing parts, wherein said mirror diaphragm has an edge which merges into a thickened peripheral section, said peripheral section being clamped in between actuating means housing parts.

12. The device according to claim 1, wherein said actuating means includes an actuating head and a position of said actuating head can be detected to determine a position of said mirror diaphragm.

13. The device according to claim 12, further comprising means for detecting the position of said actuating head by interference of a light beam reflected by said actuating head with a reference light beam.

14. The device according to claim 13, wherein said means for detecting comprises a secondary light source, a beam splitter splitting a light beam from said secondary light source into a first beam and a second beam, and a detector, wherein said actuating head receives and reflects said first beam, said reflected first beam is delivered to said detector, and said second beam serves as said reference light beam and is delivered to said detector.

15. The device according to claim 1, further comprising a plurality of deflection mirrors with displaceable mirror diaphragms located in the light beam path.

16. The device according to claim 15, wherein said plurality of deflection mirrors are arranged in different planes.

17. The device according to claim 1, wherein the focusing optics additionally contain a focusing lens system.

18. The device according to claim 1, wherein the focusing optics are arranged on a movable slide.

19. The device according to claim 1, wherein said light source is a laser and said light beam is a laser beam.

20. A method of producing a printing stencil comprising the steps of:

rotatably supporting a printing cylinder;

directing a light beam onto the printing cylinder via focussing optics;

measuring a distance from a sensor to a surface of the printing stencil;

generating an actuating signal as a function of said distance; and deforming a deflection mirror diaphragm of said focussing optics in accordance with said actuating signal.

21. The method according to claim 20, wherein said deforming step includes deforming a central rear part of said mirror diaphragm.

22. The method according to claim 20, wherein said deforming step includes delivering said actuating signal to an actuating head and the method further comprises delivering a detecting light beam to said actuating head, delivering a light beam reflected from said actuating head to a detector, delivering a reference beam to said detector, determining from interference of said delivered beams, a position of said actuating head, and determining, from said position of said actuating head, a position of said mirror diaphragm.

* * * * *